(12) United States Patent
Lersch et al.

(10) Patent No.: US 8,425,637 B2
(45) Date of Patent: Apr. 23, 2013

(54) PROCESS AND SYSTEM FOR CONVERTING WASTE MATERIAL TO FUEL OR SYNTHETIC GAS FEEDSTOCK

(76) Inventors: John R. Lersch, Leon, WV (US); Lynell Braught, White Sulphur Springs, WV (US)

( * ) Notice: Subject to any disclaimer, the term of this patent is extended or adjusted under 35 U.S.C. 154(b) by 316 days.

(21) Appl. No.: 12/793,740

(22) Filed: Jun. 4, 2010

(65) Prior Publication Data

US 2011/0296758 A1 Dec. 8, 2011

(51) Int. Cl.
*C10J 3/00* (2006.01)
(52) U.S. Cl.
USPC .................................. 48/61; 48/113
(58) Field of Classification Search ................. 165/DIG. 135–DIG. 161
See application file for complete search history.

(56) References Cited

U.S. PATENT DOCUMENTS

| | | | | |
|---|---|---|---|---|
| 4,123,332 A * | 10/1978 | Rotter | ............................ | 201/15 |
| 4,308,103 A * | 12/1981 | Rotter | ............................ | 202/117 |
| 4,639,217 A * | 1/1987 | Adams | ............................ | 432/107 |
| 4,831,944 A | 5/1989 | Durand et al. | | |
| 5,319,176 A | 6/1994 | Alvi et al. | | |
| 5,958,264 A | 9/1999 | Tsantrizos et al. | | |
| 6,039,774 A * | 3/2000 | McMullen et al. | ............ | 48/102 A |
| 6,089,169 A | 7/2000 | Comiskey | | |
| 6,105,275 A * | 8/2000 | Aulbaugh et al. | ............ | 34/424 |
| 6,155,182 A | 12/2000 | Tsangaris et al. | | |
| 6,810,821 B2 | 11/2004 | Chan | | |
| 6,817,388 B2 | 11/2004 | Tsangaris et al. | | |
| 6,932,002 B2 | 8/2005 | May et al. | | |
| 6,971,323 B2 | 12/2005 | Capote et al. | | |
| 7,216,593 B2 | 5/2007 | Capote et al. | | |
| 7,947,155 B1 * | 5/2011 | Green et al. | ....................... | 201/2 |
| 2002/0117388 A1 * | 8/2002 | Denison | ......................... | 201/25 |
| 2002/0119089 A1 * | 8/2002 | Masemore et al. | ........ | 423/449.7 |
| 2004/0182001 A1 * | 9/2004 | Masemore et al. | ...... | 48/197 FM |
| 2010/0050466 A1 * | 3/2010 | Titmas | .......................... | 34/499 |

* cited by examiner

*Primary Examiner* — Imran Akram
(74) *Attorney, Agent, or Firm* — Spilman Thomas & Battle, PLLC; Richard W. James

(57) ABSTRACT

A waste processing system and method is described. The waste processing system may be used to treat any type of waste material that may be decomposed upon the application of energy, wherein recyclable metal and/or a gaseous end product is/are generated which may have commercial or industrial applications. The waste material may be reduced in size and passed to a purge vessel where the oxygen content of the waste material is reduced. The waste material is then heated in a heat exchanger which may be linearly elongated and passed to a conversion chamber where it is treated with H—H—O gas torches. A final gaseous end product is generated which may be used as a fuel source.

11 Claims, 3 Drawing Sheets

PROCESS AND SYSTEM FOR CONVERTING WASTE MATERIAL TO FUEL OR SYNTHETIC GAS FEEDSTOCK

CROSS-REFERENCE TO RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL ON DISC

Not Applicable

BACKGROUND

1. Technical Field of the Invention

This application discloses embodiments describing apparatuses, systems, and processes by which waste material is treated with H—H—O gas torches and gaseous end product(s) is/are generated that may be used in other commercial or industrial applications.

2. Background of the Invention

Processing of waste material, and especially hazardous waste material, is a continuing problem in many industrial and non-industrial settings. Landfill space is decreasing and costs are rising. Moreover, the shipment and processing of hazardous waste material can pose a significant risk to public health and the environment. In view of these concerns, both the public and private sectors have long sought waste processing solutions that reduce overall waste volume, detoxify hazardous content and/or neutralize or stabilize the waste end products to prevent undesired spreading through leaching, airborne discharge or the like.

Even more desirable would be a system and method which is additionally capable of recovering recyclable materials from the waste and/or producing useable end products. Such a system and method would further reduce the environmental and actual cost of waste processing. Numerous methods have been proposed for the conversion of waste material into energy; the most common of which is incineration Incineration of waste material has proven useful to reduce overall waste volume, but is a poor solution for hazardous and/or medical waste. One major problem encountered in using incinerators to combust medical waste is the heterogeneity of the waste material, which prevents the incinerators from maintaining a sufficiently high constant temperature to completely treat all of the organic and inorganic material in the waste. For example, a first bag of medical waste may be filled with containers of fluids, while a second bag may contain mostly plastics, paper, rubber gloves, and the like. These two bags, fed independently into an incinerator, would create totally different combustion conditions. The first bag would quench and cool the combustion process, while the second bag would accelerate and raise temperatures. During the low temperature cycle, products of incomplete combustion (pollutants) and potentially hazardous organic materials, such as dioxin, furan, and greenhouse gases, may be generated and ultimately released into the atmosphere. During the high temperature cycle, particulate, nitrogen oxide, and metal oxide emissions increase, including hexavalent chromium, a known carcinogen.

Further compounding the problem, the incineration process introduces the waste material to a high temperature chamber which reacts the waste with large amounts of air, resulting in the production of large amounts of hot off-gas which is laden with entrained particulates and acid gas components.

While the incineration process has been used to recover energy from this hot dirty gas, this method is subject to two main problems. First, heat recovery boilers are susceptible to corrosion from the acid gas and fouling from the particulates, especially above temperatures of 700° C. Second, the slow cooling of gas in a recovery boiler is the major cause for the de novo synthesis of dioxins that occurs in the temperature range of 250-400° C. Thus, energy cannot be safely recovered at temperatures below 400° C. because of the risk of forming dioxins. In a typical incinerator, gases exit the main incineration chamber at 1100° C. and exit the chimney at 150° C. Energy can only be practically and safely recovered in the range from 700 to 400° C., meaning that only about one third of the available energy can be recovered.

Other reactors have not provided an effective solution to the problem either. Joule effect reactors are problematic for processing waste materials that may contain metallic materials. Joule effect heaters employ a pair of electrodes that extend into the reactor bed to electrically heat the reactor bed as well as the waste material contained in the reactor bed. Any molten metallic materials in the waste can provide a conductance path between the electrodes and short-circuit the electrical resistance that generates the joule effect heat. Induction heaters are problematic for other types of waste. In particular, induction heaters are suitable mostly for melting metal and their efficiency and effectiveness are greatly reduced when the waste contains other materials such as cellulose and plastic.

Plasma torches offer an alternative source of heating, and are capable of achieving the high temperatures required to combust a wide range of waste material, independent of the waste composition. The plasma will melt inorganic components of the waste material into an inert slag and will dissociate them from the organic components of the waste, which will form a gas. Plasma torches may still utilize oxygen, however, resulting in the production of large amounts of oxidized matter which may be laden with entrained particulates (soot).

Thus, there is a need in the industry for a system and method of treating waste material or other usable energy containing material in an environmentally friendly manner which may also be capable of recovering recyclable materials from the waste and/or producing gaseous fuel end products.

SUMMARY

A first embodiment of the invention is a system for the disposal of waste material, comprising: a means for reducing overall dimensions of a quantity of waste material; a temporary storage receptacle; a purging chamber in fluid communication with the temporary storage receptacle comprising at least one purging valve, wherein the purging chamber is flanked at both ends by closure valves; a linearly elongated conveyor/heat exchanger assembly in fluid communication with the purging chamber; a conversion chamber in fluid communication with both an inner and outer bore of the conveyor/heat exchanger assembly; and a gas storage container in fluid communication with the outer bore of the conveyor/heat exchanger assembly. The conveyor/heat exchanger assembly may have an inner bore which comprises a means for conveyance of the waste material, and an outer bore. The conversion chamber may comprise a jacket of refractory material, at least one H—H—O gas torch, and at least one valve for removal of solids from the conversion chamber.

In alternate embodiments, the system for disposal of waste material may further comprise a means for removing recyclable metal materials from the quantity of waste material, wherein the means for removing recyclable metal materials may comprise at least a magnetic reclaimer or non-ferrous reclaimer. In further alternate embodiments, the system may further comprise a means for controlling both the H—H—O gas torch(es) and the means for conveyance of the waste material so that the waste material is heated to a sufficiently high temperature for a sufficient period of time to thermally decompose the waste material to stable final products. The stable products may include at least hydrogen and/or carbon monoxide gases.

In alternate embodiments, the purging valve of the purging chamber may be operated to allow reduction of a quantity of oxygen in the waste material resident in the purging chamber. Further, the system may comprise a second heat exchanger operatively coupled and in fluid communication with the outer bore of the conveyor/heat exchanger assembly; a particulate filter operatively coupled and in fluid communication with the outer bore of the conveyor/heat exchanger assembly; a water/NaOH bath operatively coupled and in fluid communication with the outer bore of the conveyor/heat exchanger assembly; an activated carbon filter operatively coupled and in fluid communication with the outer bore of the conveyor/heat exchanger assembly; and a compressor operatively coupled and in fluid communication with the outer bore of the conveyor/heat exchanger assembly and the gas storage container.

A second embodiment of the invention is a method for processing waste, comprising: reducing dimensions of a quantity of waste material; passing the reduced dimension waste material to a purge chamber; reducing the quantity of oxygen in the purge chamber; passing the oxygen free reduced dimension waste material from the purge chamber through a heat exchanger; heating the oxygen free reduced dimension waste material in the heat exchanger; passing the heated oxygen free reduced dimension waste material from the heat exchanger to a conversion chamber; heating the oxygen free reduced dimension waste material in the conversion chamber using at least one H—H—O gas torch to generate at least a gaseous product; passing the gaseous product through a heat exchanger to cool the gaseous product; and harnessing the gaseous product.

Alternate embodiments of the method further comprise steps for removing recyclable metal materials from the quantity of waste material. Removing recyclable metal materials from the quantity of waste material may comprise removing at least a magnetic metal or a non-ferrous metal.

In further alternate embodiments of the method, harnessing the gaseous product comprises passing the gaseous product to a gas storage container. The gaseous product may be passed through a second heat exchanger to further cool the gaseous product before harnessing. Further, the gaseous product may be passed through a particulate filter, a water/NaOH bath, and/or an activated carbon filter before harnessing. Feedstocks with certain properties may benefit from additional treatment before the produced gas is used.

A third embodiment of the invention is a gaseous fuel produced by a process comprising: reducing dimensions of a quantity of waste material; passing the reduced dimension waste material to a purge chamber; reducing the quantity of oxygen in the purge chamber; passing the oxygen free reduced dimension waste material from the purge chamber through a heat exchanger; heating the oxygen free reduced dimension waste material in the heat exchanger; passing the heated oxygen free reduced dimension waste material from the heat exchanger to a conversion chamber; heating the oxygen free reduced dimension waste material in the conversion chamber using at least one H—H—O gas torch to generate at least a gaseous fuel; passing the gaseous fuel through a heat exchanger to cool the gaseous product; and harnessing the gaseous fuel.

BRIEF DESCRIPTION OF THE DRAWINGS

Aspects, features, benefits and advantages of the embodiments herein will be apparent with regard to the following description, appended claims, and accompanying drawings, where:

DETAILED DESCRIPTION

In the following description, the present invention is set forth in the context of various alternative embodiments and implementations involving apparatuses, systems, and processes by which waste material may be treated with H—H—O gas torches and gaseous end product(s) is/are generated that may be used in other commercial or industrial applications. It will be appreciated that these embodiments and implementations are illustrative and various aspects of the invention may have applicability beyond the specifically described contexts. Furthermore, it is to be understood that these embodiments and implementations are not limited to the particular compositions, methodologies or protocols described, as these may vary. The terminology used in the following description is for the purpose of illustrating the particular versions or embodiments only, and is not intended to limit their scope in the present disclosure which will be limited only by the appended claims.

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

"Optional" or "optionally" means that the subsequently described event or circumstance may or may not occur, and that the description includes instances where the event occurs and instances where it does not. In addition, the word "comprising" as used herein means "including, but not limited to". Throughout the specification of the application, various terms are used such as "primary", "secondary", "first", "second", and the like. These terms are words of convenience in order to distinguish between different elements, and such terms are not intended to be limiting as to how the different elements may be utilized.

It must also be noted that as used herein and in the appended claims, the singular forms "a", "an", and "the" include the plural reference unless the context clearly dictates otherwise. Thus, for example, reference to a "gas" is a reference to one or more gases and equivalents thereof known to those skilled in the art, and so forth. Unless defined otherwise, all technical and scientific terms used herein have the same meanings as commonly understood by one of ordinary skill in the art.

Figure 1:
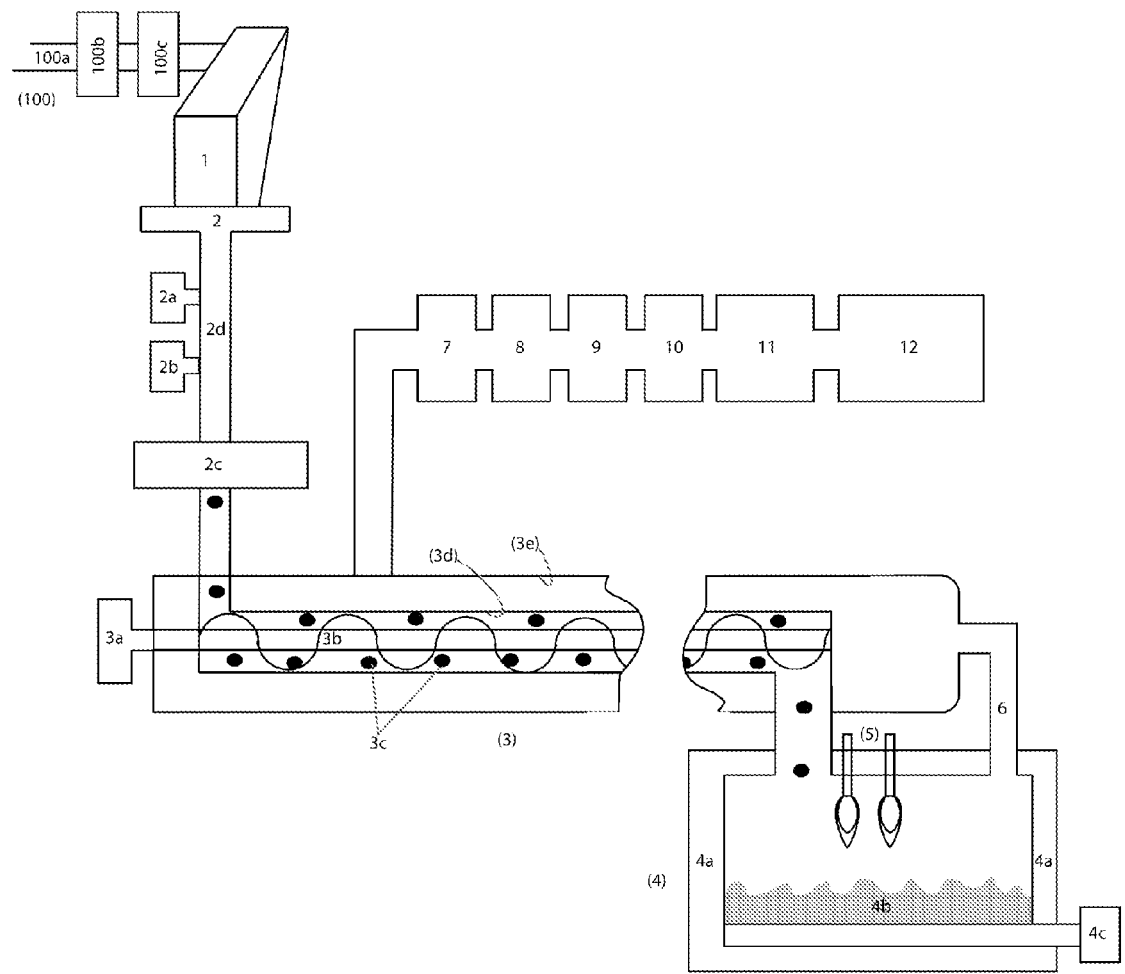
FIG. 1 is a schematic illustration of a system or process for converting waste material to gaseous material for use in other commercial or industrial systems or processes.

With reference to the figures, a waste processing system and method is described hereinafter in detail. The waste processing system may be used to treat any type of waste material or other energy containing material that may be decomposed upon the application of energy, wherein recyclable metal and/or a gaseous end product is/are generated which may have commercial or industrial applications. FIG. 1 depicts one embodiment of a system by which gas, recyclable metal, disposable material, or any combination of each, is produced from waste material for further use.

The waste material may be municipal solid waste, medical waste, fly and bottom ash, other energy containing material, and military waste, including weapon components. The waste processing system may also be used to treat other waste material such as PCB-contaminated materials, industrial and laboratory solvents, organic and inorganic chemicals, pesticides, organo-chlorides, refinery waste, office waste, cafeteria waste, facilities maintenance waste such as wooden pallets, oils, grease, discarded light fixtures, yard waste, wastewater sludge, and pharmaceutical waste. The waste material, furthermore, may include organic and inorganic components and may be in the form of solid and/or liquid material.

For ease of reference, the figures and description sometimes refer to the waste material as medical waste, which may include, for example, bags of infectious waste, including blood-soaked sponges, bandages, containers of sharps such as needles, razors, scalpels, and other instruments. It is to be understood, however, that unless stated otherwise or unless it is clear from the context, when reference is made to medical waste or some other particular type of waste material, it also encompasses other types of waste.

A quantity of waste material may be processed or prepared in which recyclable metal material is removed, including commonly recyclable metal materials derived from scrap metal, such as steel, aluminum, copper, zinc, lead, and other metals derived from other sources, such as alkaline batteries and rechargeable batteries (e.g. Ni—Cd, Ni-MH, Li-ion). Generally, the recyclable metal material produces a low to zero energy-yield in the following process, thus, sorting and separating the recyclable metal material from the convertible waste material optimizes the energy-yield of the process. Furthermore, recovery of salvageable and recyclable metal will decrease the amount of waste material to be processed. Moreover, any monies received for the recovered metal may reduce the overall cost of treating the waste material.

The separation and/or removal of the recyclable metal material may be achieved manually or by additional components operatively coupled with the components of the process described below. For example, the waste material may be passed through a metal reclaiming facility (100) comprised of one or more magnetic reclaimer (100*b*) which act to remove magnetic materials from the stream of waste material and one or more non-ferrous reclaimer (100*c*) which act to remove non-magnetic materials from the stream of waste material. The magnetic reclaimer may be of any suitable type such as, but not limited to, a tramp magnet or magnet head pulley, a magnetic belt, magnetic drum or other moving magnetic system. The non-ferrous metals may be separated from the waste material manually or by other known methods such as, but not limited to, an eddy-current separator or non-ferrous magnet. The waste material may be transferred through the metal reclaiming facility by a conveyance means (100*a*). Any conveyance means known in the art may be used including, but not limited to, industrial screw-type conveyors and industrial belt conveyors or feeders.

Following the removal of the recyclable metal material, the remaining waste material may be ground or shredded into particles having a diameter of approximately 0.25 inches. Any means of grinding or shredding the waste material such as, for example, an auger may be used in various embodiments of the invention. Furthermore, grinding or shredding of the waste material may occur before or after processing for removal of the recyclable metal material. The grinding or shredding means may be included as part of a temporary storage receptacle (1), a purging chamber (2*d*), or as a separate apparatus. If the means of grinding or shredding the waste material is a separate apparatus, such may be placed at any point along the system, such as before or after the metal reclaiming facility (100).

The reduced-size waste material is introduced into the temporary storage receptacle (1). Introduction of the waste material to the temporary storage receptacle (1) may be by gravity or by some other mechanical means. The desired rate at which the waste material is fed into the temporary storage receptacle (1) may be dependent on various factors such as, but not limited to, the characteristics of the waste material, the energy available from a downstream heating system versus the energy expected to be required for the completion of a gasification and melting process, the expected amount of end product to be generated, and/or the temperature and/or oxygen conditions within the temporary storage receptacle (1).

The waste material may be liquid, solid or a combination of both. Solid and liquid waste material may be treated separately or at substantially the same time. To process the waste material separately, the solid and liquid waste material may be separately introduced into the system (FIG. 1) through either the same temporary storage receptacle (1) or through different unique entry points. To process the waste material at substantially the same time, the solid and liquid waste material may be introduced at substantially the same time. When the solid and liquid waste material is processed at substantially the same time, liquid waste material may be introduced into the temporary storage receptacle (1) to create a homogenous mix of solid and liquid waste material. Alternatively, liquid waste material may be introduced into the system (FIG. 1) through a separate entry port which may be concurrent with or downstream from the temporary storage receptacle (1).

The temporary storage receptacle (1) may be equipped to minimize or control air entry into the system, at least during operation. This may be accomplished by batch operation in which the temporary storage receptacle (1) is filled with the reduced-size waste material to be treated and a lid or closure is moved by a hydraulic motor or other suitable operator to seal against the entry opening. Alternatively, a gas molecular seal around the entry to the temporary storage receptacle (1)

may be provided. Such a system provides a gas such as, but not limited to, nitrogen, carbon monoxide (engine exhaust), carbon dioxide, or any other available gas that reduces the quantity of oxygen present in the waste material inside the temporary storage receptacle (1) inlet and thereby allows continuous delivery of waste material through the temporary storage receptacle (1) inlet while minimizing or controlling the amount of oxygen entering the temporary storage receptacle (1) through the inlet.

The temporary storage receptacle (1) may be in fluid communication with a purging chamber (2d), wherein the storage receptacle (1) actively or passively discharges or feeds the waste material into the purging chamber (2d) for treatment. In one embodiment of the process, a closure valve (2) may be disposed between the storage receptacle (1) and the purging chamber (2d). The closure valve (2) may be selectively opened or closed, thereby controlling the quantity of waste material discharged into the purging chamber (2d), as well as effectively sealing one end of the purging chamber (2d) and forming an air lock for treatment of the waste material. In other embodiments, selectively movable mechanical devices that interfere or obstruct the discharge of fluid or material may be used as a substitute for one or more valves.

At least one purging valve (2a), and in other embodiments multiple purging valves (2a) and (2b), is/are operatively coupled and in fluid communication with the air-locked waste material in the purging chamber (2d). The purging valve (2a) and/or (2b) discharge or deliver a quantity of purging gas to reduce the quantity of oxygen present in the waste material. The purging gas may include nitrogen, carbon monoxide (engine exhaust), carbon dioxide, or other available gases that reduce the quantity of oxygen present in the waste material. The purging chamber (2d) is in fluid communication with a conveyance (3b) within a conveyor/heat exchanger assembly (3). After the waste material is treated, the waste material is discharged or delivered from the purging chamber (2d) via a closure valve (2c) to the conveyance for further processing.

In one embodiment, the conveyor/heat exchanger assembly (3) is linearly elongated, and includes an inner bore (3d) and an outer jacket (3e). The inner bore (3d) includes the conveyance (3b). The outer jacket (3e) is in fluid communication with a conversion chamber (4) via a conduit (6) to receive heated gas discharged from the conversion chamber (4). The current of the heated gas flows against the directional movement of the waste material. The heated gas and outer jacket (3e) facilitate heating of the waste material traveling through the inner bore via the conveyance (3b). Heating of the waste material before it enters the conversion chamber (4) reduces the energy and heat required to convert the waste material to gas, disposable material, or a combination of both.

In the conveyor/heat exchanger assembly (3), a drive motor (3a) urges the conveyance (3b) to facilitate downstream movement of the waste material (3c) toward a conversion chamber (4). The terminal portion of the inner bore (3d) is in fluid communication with the conversion chamber (4). It is envisioned that the conveyance (3b) may comprise a variety of configurations or arrangements including, but not limited to, industrial screw-type conveyors and industrial belt conveyors or feeders. FIG. 1 depicts an industrial screw conveyor (3b).

The heated waste material (3c) is transferred from the conveyor/heat exchanger assembly (3) to the conversion chamber (4) for further processing. The conversion chamber (4) comprises a plurality of torches (5) for heating the chamber (4) and the waste material transferred to the chamber (4). Refractory material (4a) is provided as an inner lining to the conversion chamber (4). The conversion chamber (4) may also include at least one valve (4c) operatively coupled and selectively openable and closeable for removing non-organic solids and residue (4b) from the conversion chamber (4) base. The at least one valve (4c) may be employed to collect non-organic solids at any time before, during or after conversion.

At least one torch (5) comprises the gaseous mixture of hydrogen as (H) or ($H_2$) and oxygen ($O_2$). Generally, this gaseous mixture is referred as H—H—O or oxyhydrogen gas. The use of H—H—O gas does not use or introduce excess oxygen into the conversion chamber (4), thereby preventing oxidization of the gas released in the conversion of waste material to gas and/or disposable material.

The at least one, or plurality, of torches (5) heats solids placed in the conversion chamber (4). The solids are reduced to a combination of carbon monoxide and hydrogen gas, as well as melted non-organic residue (4b) accumulating in the base of the conversion chamber (4). It is envisioned that the internal temperature of the conversion chamber (4) may reach approximately 1800° F., though the temperature may be varied and may be controlled by adjusting the flow of the H—H—O gas from the torch(es) (5). It is noted that HHO gas has the ability to heat virtually any material to the point of melting or gasification.

The gas or gasses produced as a result of converting the waste material via the conversion chamber (4) are discharged and transferred by the conduit (6) to the outer jacket (3e) of the conveyor/heat exchanger assembly (3). As previously described, the heated gas transfers heat to the waste material (3c) traveling through the inner bore (3d) of the conveyor/heat exchanger assembly (3). The gas is eventually cooled through this transfer of heat to the waste material.

In another embodiment, one or more additional apparatuses, devices and/or components is/are operatively coupled to the outer jacket (3e) of the conveyor/heat exchanger assembly (3). As depicted, one of the additional apparatuses may include an additional heat exchanger (7) operatively coupled to the outer jacket (3e) of the conveyor/heat exchanger assembly (3). The additional heat exchanger (7) may facilitate additional cooling of the gas exiting the conveyor/heat exchanger assembly (3), thus removing any excess heat from the gas.

It is further envisioned that another apparatus, such as a particulate filter (8) may be operatively coupled and in fluid communication with the heat exchanger (7). The particulate filter (8) may remove various particulates and/or contaminants from the gas stream, including ash and other by-products that may be produced from the conversion of the waste material to gas. It is also envisioned that one or more additional particulate filters may be operatively coupled and in fluid communication with the heat exchanger (7) and/or any installed particulate filter (8).

It is further envisioned that a water and NaOH bath (9) may be operatively coupled and in fluid communication with the heat exchanger (7) and/or particulate filter(s) (8). The water/NaOH bath (9) may be beneficial if chlorine gas is generated from the processing of chloride-based materials, such as polyvinyl chloride. The water/NaOH bath (9) converts the chlorine gas to a salt that may be collected and disposed or reused in some capacity. The water/NaOH bath (9), or a variation of the bath using another alkaline material, may also be utilized for treatment of other halogen or halide-based materials processed in the conversion chamber (4), wherein the halogen or halide-base material(s) is/are converted to a disposable or reusable salt similar to that described above. Furthermore, if the processed material has a high sulphur content, an additional scrubber may be added to remove excess sulphur.

It is further envisioned that an activated carbon filter (10), or a plurality of activated carbon filters, may be operatively coupled and in fluid communication with one or more of the heat exchanger (7), the particulate filter(s) (8), and/or the water/NaOH bath (9) apparatus. The activated carbon filter (10) removes certain remaining contaminants or impurities from the gas stream, yielding a gaseous end-product that may be stored for additional uses or further processed if desired.

The gaseous end product may be pumped or transferred by a compressor (11) or other suitable device to a storage container (12). The end product may be used as feed stock for other industrial processes, fuel for a generator or other fuel-driven devices, fuel for generating heat, or compressed vehicle fuel. The end product may also be processed to remove or separate the remaining gas composition from hydrogen, thereby generating separate sources of gaseous product that may have alternative uses. A portion of the gaseous end product may be used as fuel to generate electricity in the utilization of the H—H—O gas torch(es) (5).

Figure 2:
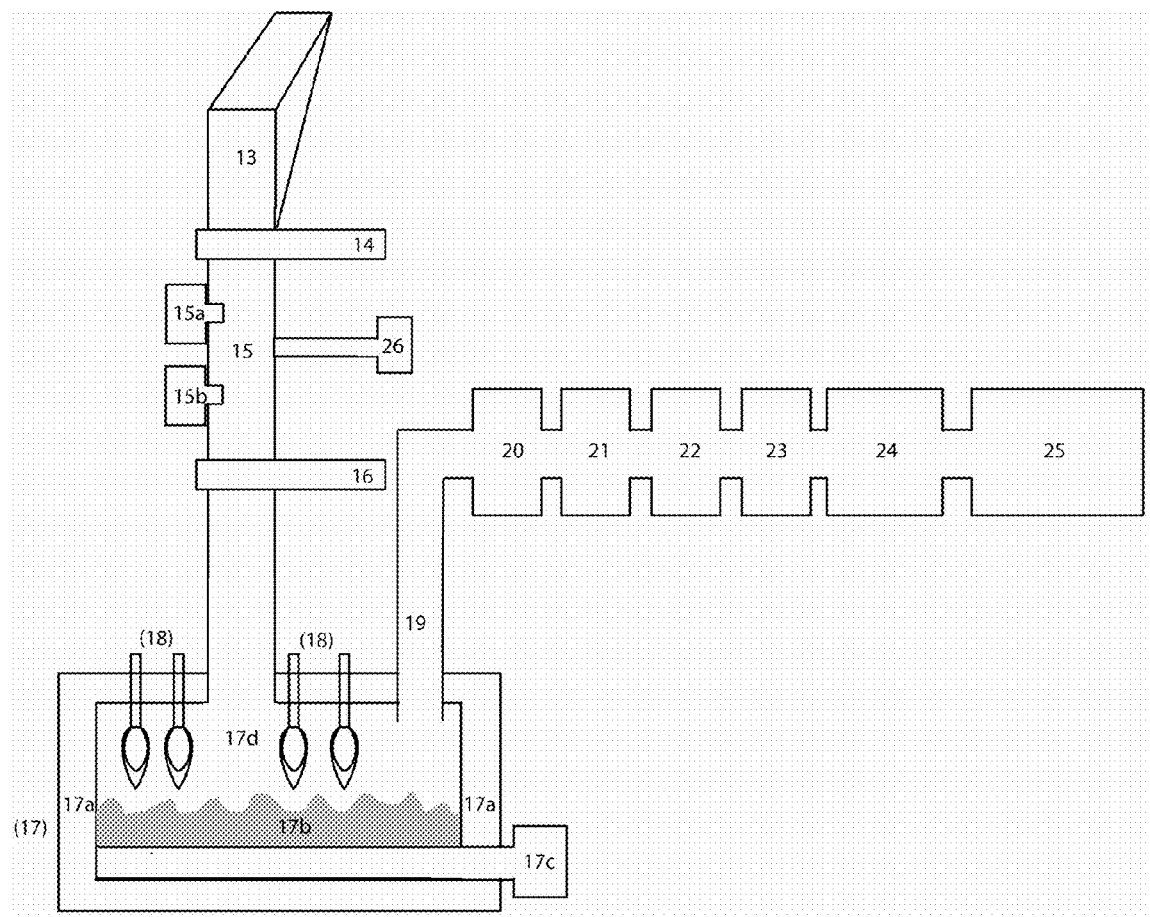
FIG. 2 is an illustration of one embodiment of a conversion chamber that may be utilized for converting hazardous waste material or medical waste material into gaseous end product (s) and/or solid material.

In another embodiment, in accordance with FIG. 2, a conversion chamber (17) configured to accommodate medical or hazardous waste is utilized, substituted for the elements (1)-(6) as depicted and described in accordance to FIG. 1. The conversion chamber (17) is operatively coupled to a feed system (13), and includes an upper air lock valve (14) and a lower air lock valve (16) disposed along the feed tube (15). A pair of purging valves (15a) and (15b) are intermediately disposed between the upper (14) and lower (16) air lock valves. The terminal end of the feed tube (15) adjacent the lower (16) air lock valve is in fluid communication with the conversion chamber (17). Within the conversion chamber (17), at least one torch (18), and as depicted a plurality of torches (18), are arranged along the interior of the chamber (17d). A melt or material (17b) is positioned within the chamber (17d) for conversion to gas and other products.

The medical or hazardous waste is staged in the feed system (13) in sealed bags or containers, for example. The upper (14) air lock valve is opened or released allowing the waste to load within the feed tube (15) between the upper (14) and lower (16) air lock valves. After closing of the upper (14) air lock valve, the purge valves (15a) and (15b) are opened to introduce available purge gas into the feed tube (15), generally to reduce the amount of oxygen in the system. The purge gas may be one or more gases, but it is generally thought that nitrogen gas or engine exhaust performs better in purging oxygen from the waste material in the feed tube (15). Thereafter, the purge valves (15a) and (15b) are closed, and the lower (16) air lock valve is opened, allowing transfer of the purged waste material from the feed tube (15) to the interior of the conversion chamber (17d).

The interior of the feed tube (15) may be relatively open and free of obstructions and contain minimal crevices or cracks in which infectious material from the medical or hazardous waste can accumulate. In one embodiment, such a design may help allow the feed tube (15) to be disinfected by a disinfectant system (26). The disinfectant system (26) may include a supply container in which an appropriate disinfectant is retained. Any disinfectant known in the art may be used. For example, a disinfectant comprising a 6% solution of hydrogen peroxide may be used. The container may be connected by a supply line to an injector nozzle mounted within the feed tube (15). It is desirable that the nozzle be arranged to ensure that the entire area within the feed tube (15) may be subjected to the disinfectant spray to help prevent or minimize the release of toxic or hazardous emissions when the upper air lock valve (14) to the feed tube (15) is opened. In an alternative embodiment, a plurality of disinfectant systems (26) or a plurality of nozzles connected to one disinfectant system (26) may be used and each may be positioned to spray disinfectant on a different portion of the feed tube (15). Also, while it is desirable to spray disinfectant on the entire area within the feed tube (15), it may be sprayed on less than the entire area. In further alternative embodiments, the disinfectant system (26) may be placed at any position above or below the upper (14) or lower (16) air lock valves. In embodiments containing a disinfectant system (26), after disinfectant is applied, it may drain into the conversion chamber (17) and be processed as waste.

In an alternative embodiment, the infectious material from the medical or hazardous waste may be decontaminated by any method known in the art, such as a UV light source or ozone source. One or a plurality of such UV light or ozone sources may be included in the feed system (13) and/or the feed tube (15), or at any point between.

A vent system may be provided within the feed tube (15) such that the purge gas introduced to the feed tube (15) through the purging valves (15a) and (15b) and any toxic/hazardous gases emitted from the medical or hazardous waste in the feed tube (15) can be drawn away for safe storage and/or decontamination. The gas can be drawn, for example, as a result of a vacuum created by a draft fan and/or ejector-venturi quencher disposed outside of the feed tube (15).

A further alternative embodiment may include an auger or any known method in the art to shred and/or mix the medical or hazardous waste in the feed tube (15). The auger may be driven by any means known in the art including, but not limited to, a hydraulic motor with a variable speed drive. Further, the feed tube (15) may be surrounded by a water-cooled jacket (not shown) to cool the feed tube (15) and to help maintain the structural integrity of the feed tube (15), which can be exposed to elevated temperatures during use of the auger or upon venting of heat from the conversion chamber (17).

Inside the conversion chamber (17d), the treated waste is heated in a manner similar to that described in the discussion of FIG. 1. Torch or torches (18) heat the waste material causing break down to solid material and a gaseous composition(s). Refractory material (17a) is provided as an inner lining to the conversion chamber (17). The conversion chamber (17) may also include at least one valve (17c) operatively coupled and selectively openable and closeable for removing non-organic solids and residue (17b) from the conversion chamber (17) base. The at least one valve (17c) may be employed to collect non-organic solids at any time before, during or after conversion.

In one embodiment, the chamber (17) may be operatively coupled and in fluid communication (19) with one or more storage containers (25), wherein the gaseous end product may be pumped or transferred by a compressor (24), generator or other means known in the art. The end product may be used as feed stock for other industrial processes, fuel for a generator or other fuel-driven devices, fuel for generating heat, or compressed vehicle fuel. The end product may also be processed to remove or separate the remaining gas composition from hydrogen, thereby generating separate sources of gaseous product that may have alternative uses. A portion of the gaseous end product may be used as fuel to generate electricity in the utilization of the H—H—O gas torch(es) (18).

In another embodiment, the conversion chamber (17) may be operatively coupled and in fluid communication (19) with one or more additional apparatuses (20-23). One of the additional apparatuses may include a heat exchanger (20), which may facilitate additional cooling of the gas exiting the conversion chamber (17), thus removing any excess heat from the gas.

It is further envisioned that another apparatus, such as a particulate filter (21) may be operatively coupled and in fluid communication with the heat exchanger (20). The particulate filter (21) may remove various particulates and/or contaminants from the gas stream, including ash and other by-products that may be produced from the conversion of the waste material to gas. It is also envisioned that one or more particulate filters may be operatively coupled and in fluid communication with the heat exchanger (20) and/or any installed particulate filter (21).

It is further envisioned that a water/NaOH bath (22) may be operatively coupled and in fluid communication with the heat exchanger (20) and/or particulate filter(s) (21). The water/NaOH bath (22) may be necessary if chlorine gas is generated from the processing of chloride-based materials, such as polyvinyl chloride. It is further envisioned that an activated carbon filter (23), or a plurality of activated carbon filters, may be operatively coupled and in fluid communication with one or more of the heat exchanger (20), the particulate filter(s) (21), and/or the water/NaOH bath (22) apparatus.

Figure 3:
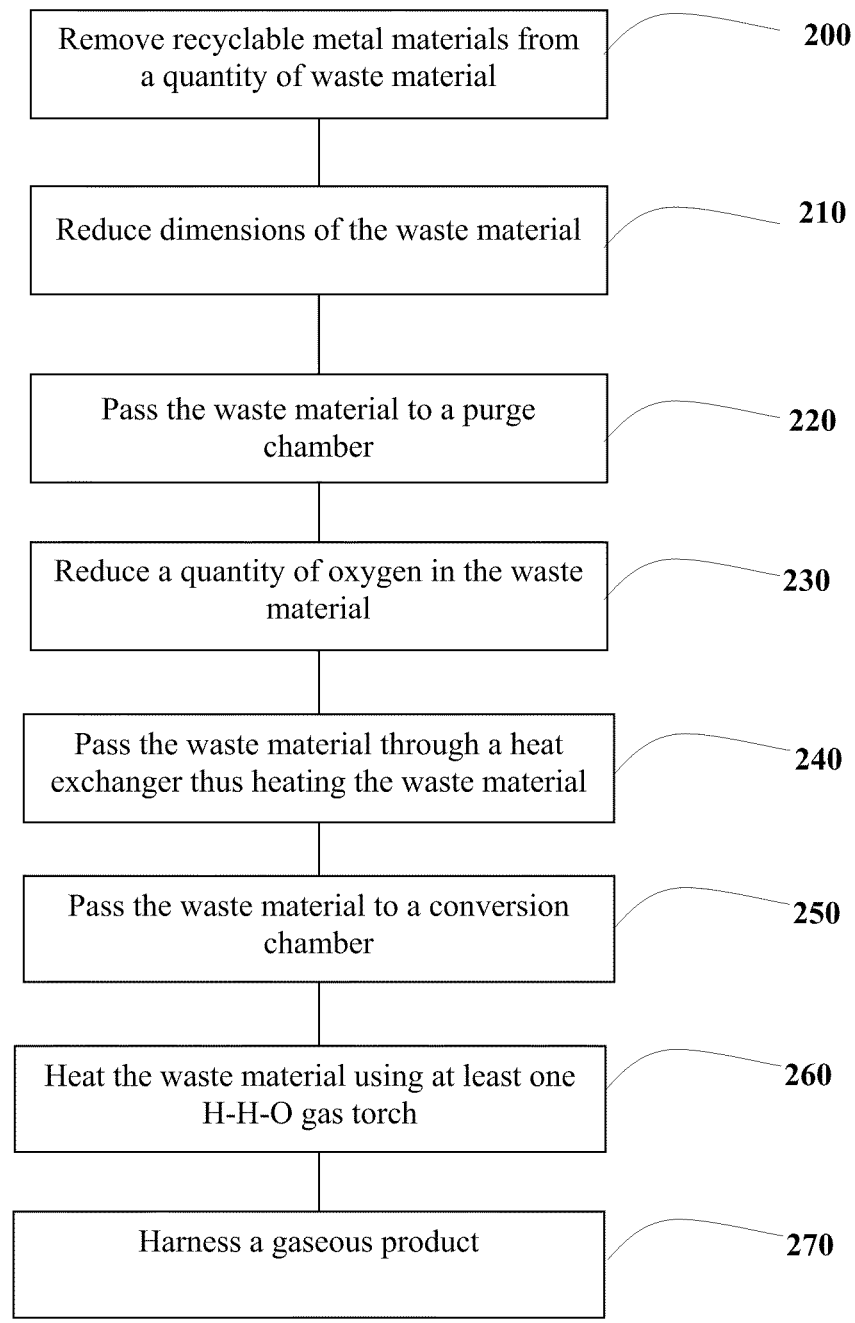
FIG. 3 depicts an exemplary flow diagram of a method for converting waste material to gaseous material for use in other commercial or industrial systems or processes.

Referring to FIG. 3, an exemplary flow diagram of a method for processing waste is depicted. At step 200 in the flow diagram, a quantity of waste material is provided from which recyclable metal materials are removed. The recyclable metal materials may be magnetic or non-ferrous as described in previous embodiments of the system for disposal of waste material. At step 210, the dimensions of the waste material are reduced. Preferably, the dimensions are reduced to a size of about 0.25 inches by grinding or shredding. Any means of grinding or shredding the waste material may be used in various embodiments of the invention. Furthermore, grinding or shredding of the waste material may occur before or after processing for removal of the recyclable metal material. At step 220, the waste material is passed to a purge chamber. While in the purge chamber, a quantity of oxygen is removed from the waste material at step 230, and the waste material is then passed through a heat exchanger at step 240 where it may be heated. At step 250, this heated waste material is passed to a conversion chamber where it is processed using at least one H—H—O gas torch at step 260. Finally, a gaseous product produced at step 260 is harnessed in step 270.

A further embodiment of the invention is a gaseous fuel produced by the method for processing waste described above in FIG. 3.

What is claimed is:

1. A system for processing waste material, comprising:
   a means for reducing overall dimensions of a quantity of waste material;
   a temporary storage receptacle;
   a purging chamber in fluid communication with the temporary storage receptacle comprising at least one purging valve, wherein the purging chamber is flanked at both ends by closure valves;
   a conveyor/heat exchanger assembly in fluid communication with the purging chamber, wherein the conveyor/heat exchanger is linearly elongated and comprises:
      an inner bore, wherein the inner bore comprises a means for conveyance of the waste material, and
      an outer bore;
   a conversion chamber in fluid communication with both the inner and outer bores of the conveyor/heat exchanger assembly, comprising:
      a jacket of refractory material,
      at least one H—H—O gas torch, and
      at least one valve for removal of solids from the conversion chamber; and
   a gas storage container in fluid communication with the outer bore of the conveyor/heat exchanger assembly.

2. The system according to claim 1, further comprising a means for removing recyclable metal materials from the quantity of waste material.

3. The system according to claim 2, wherein the means for removing recyclable metal materials from the quantity of waste material comprises at least a magnetic reclaimer or non-ferrous reclaimer.

4. The system according to claim 1, further comprising a means for controlling the at least one H—H—O gas torch and the means for conveyance of the waste material so that the waste material is heated to a sufficiently high temperature for a sufficient period of time to thermally decompose the waste material to stable final products.

5. The system according to claim 4, wherein the stable final products include at least a hydrogen and a carbon monoxide gas.

6. The system according to claim 1, wherein the purging valve of the purging chamber may be operated to allow reduction of a quantity of oxygen in the waste material resident in the purging chamber.

7. The system according to claim 1, further comprising a second heat exchanger operatively coupled and in fluid communication with the outer bore of the conveyor/heat exchanger assembly.

8. The system according to claim 1, further comprising a particulate filter operatively coupled and in fluid communication with the outer bore of the conveyor/heat exchanger assembly.

9. The system according to claim 1, further comprising a water/NaOH bath operatively coupled and in fluid communication with the outer bore of the conveyor/heat exchanger assembly.

10. The system according to claim 1, further comprising an activated carbon filter operatively coupled and in fluid communication with the outer bore of the conveyor/heat exchanger assembly.

11. The system according to claim 1, further comprising a compressor operatively coupled and in fluid communication with the outer bore of the conveyor/heat exchanger assembly and the gas storage container.

* * * * *